Nov. 28, 1933.  R. B. SPIKES  1,936,996
TRANSMISSION AND SHIFTING MEANS THEREFOR
Filed Dec. 17, 1932   2 Sheets-Sheet 1

INVENTOR.
RICHARD B. SPIKES.
BY *Joseph J. Cole*
ATTORNEY

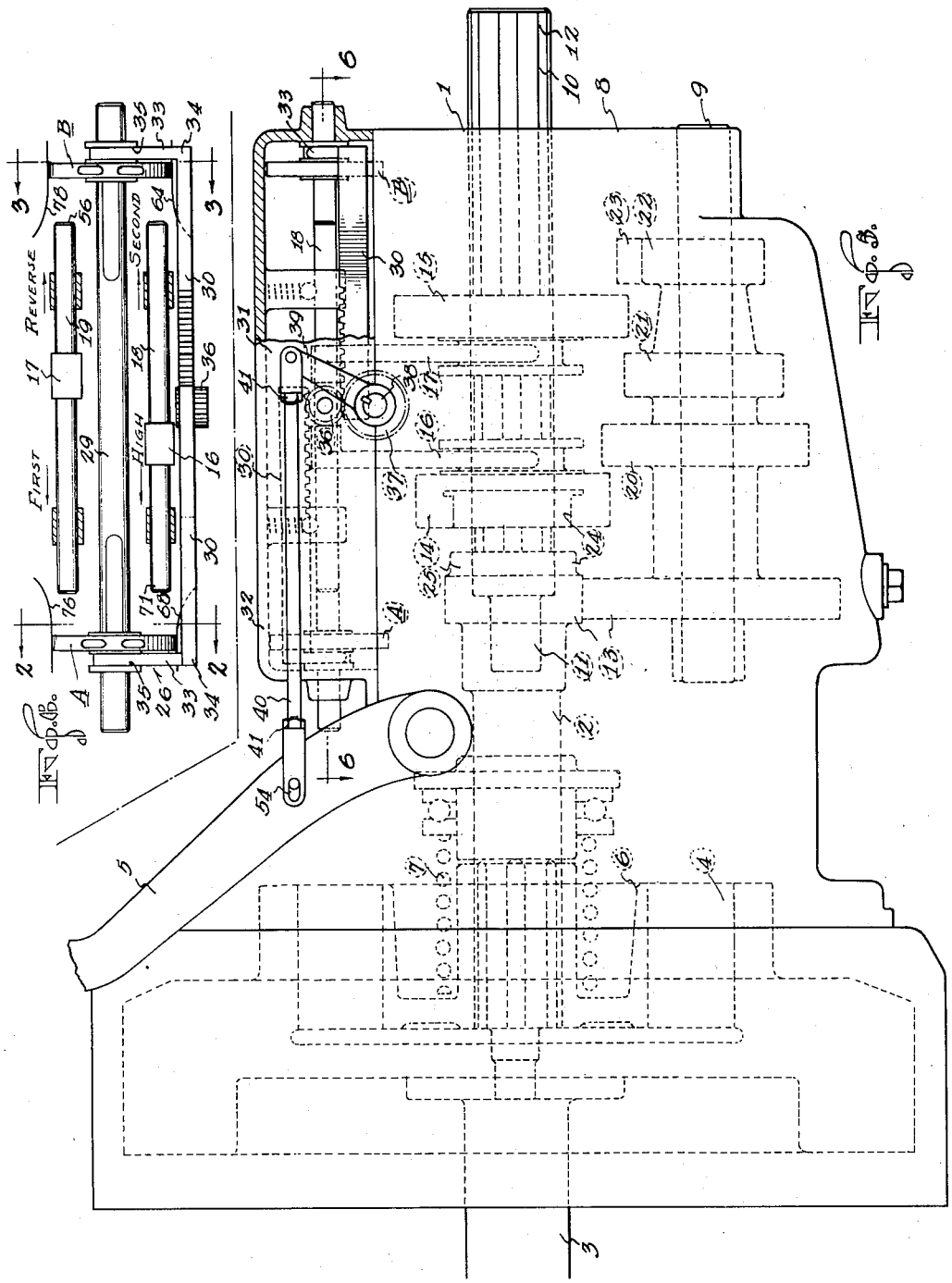

Patented Nov. 28, 1933

1,936,996

UNITED STATES PATENT OFFICE 1,936,996

TRANSMISSION AND SHIFTING MEANS THEREFOR

Richard B. Spikes, San Francisco, Calif.

Application December 17, 1932
Serial No. 647,772

8 Claims. (Cl. 74—58)

The present invention relates to improvements in transmissions and shifting means therefor, and has among its objects the provision of a transmission having a gear shifting selector associated therewith adapted to be operated from the driver's compartment of a vehicle through a selective indicator, and arranged for automatically shifting the gears of the transmission selected upon disengaging the conventional clutch. The driver moves the indicator at any convenient time for a contemplated change in gear speed, and upon depressing the clutch pedal the clutch is first disengaged during the initial movement of the clutch pedal, and further movement acts to move the gears from a previous shift into neutral position and thereafter the gears set up in the new selection are actually moved into driving engagement. The operation takes place in a single movement of the clutch pedal and the steps follow without interruption.

It is particularly proposed to accomplish the shifting of the gears through mechanical means, which are simple in construction, durable and efficient for carrying out the operation of the transmission.

Moreover, I propose to provide a selector that may be readily attached to a conventional transmission with but slight alteration in the latter. The selector is adapted for mounting on the transmission housing and beneath the floor of the vehicle, and this leaves the driver's compartment free and unobstructed.

Other objects will appear as the specification proceeds, and the novel features will be particularly set forth in the appended claims.

For a better understanding of my invention, reference should be had to the accompanying drawings, forming part of this application, in which:

Figure 1 is a fragmentary perspective view of an automobile having my transmission embodied therein;

Figures 2 and 3 are sectional views taken along lines 2—2 and 3—3, respectively, of Figure 6;

Figure 5 is a side elevation of the transmission with parts broken away so as to disclose the interior thereof; and Figure 6 is a section along line 6—6 of Figure 5.

Figure 1:
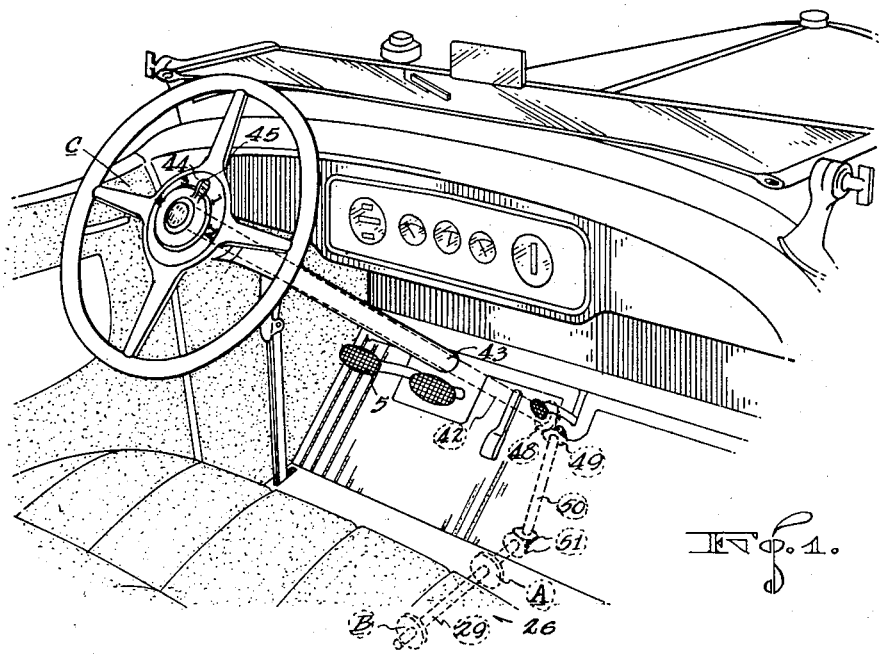

Although I have shown only the preferred form of my invention, it should be particularly understood that various changes or modifications may be made within the scope of the appended claims without departing from the spirit of the invention.

In carrying my invention into practice I provide a transmission indicated generally at 1, and having a stub shaft 2 rotatably mounted therein that is adapted to be connected to a source of motive power 3 by means of a conventional clutch 4, the latter being operated by a foot pedal 5. The clutch that I have illustrated is of the multiple disc type, in which the plates are caused to separate upon depressing the pedal for disengaging the driven element 6 of the clutch from the driving source. The clutch further includes a spring 7 arranged for returning the plates to driving position upon releasing the pedal. It will of course be appreciated that any suitable type of clutch may be employed in association with the transmission.

Within the transmission housing 8 is also mounted a countershaft 9 in parallel relation with a driven shaft 10, the latter being axially aligned with the stub shaft and having one end thereof journalled in the stub shaft as at 11, while the opposite end extends from the housing at 12 for connection to the propeller shaft in the usual manner. The countershaft is rotated by the stub shaft through gearing 13, the gears of which are in constant mesh.

The driven shaft of the transmission has a pair of selective gears 14 and 15 splined thereon, which are adapted for axial sliding along the shaft by means of forks 16 and 17, respectively, the fork 16 being anchored to a shifting rod 18 and the fork 17 fixed to a second shifting rod 19.

It will be noted from Figure 5 that the countershaft above referred to has driving gears 20, 21 and 22 secured thereto which provide for the different speed ratios and direction of turning between the shafts 2 and 10. Upon sliding the gear 15 into mesh with gear 21 by moving the shifting rod 19 to the left in Figure 6, the transmission is thereupon shifted into "low", while a movement of the rod in the opposite direction will effect "reverse", an idler pinion 23 being used for interposition between the gears 15 and 22.

In shifting the transmission into "second" or "intermediate" the gear 14 is placed in driving engagement with the gear 20, and this is accomplished by imparting endwise movement of the shifting rod 18 to the right in Figure 6, the fork 16 in this case being actuated. "High" or "third" is effected by connecting the shafts 2 and 10 directly through the medium of the usual jaw clutch arrangement 24, rod 18 being moved to the left for shifting the gear 14 into telescoping relation with the teeth 25 projecting from the pinion on the shaft 2.

While I have described this particular type of a transmission, it will be appreciated that other transmissions may be employed, and the free-wheeling and synchro-mesh features which are now well known in the art may be incorporated in the transmission described hereinbefore.

For moving the shifting rods 18 and 19 as previously mentioned I provide a gear shifting selector 26 that is particularly illustrated in Figure 6, and comprising in its structural features a revolvably mounted shaft 29 having a pair of discs A and B splined thereon and arranged to be moved toward or away from each other. The means for moving these discs consist of racks 30 which are slidably secured to the side 31 of a housing 32, forks 33 being extended from the rack ends 34 into engagement with annular grooves 35 which are fashioned in the hubs of the discs.

In Figures 5 and 6 I show a pinion 36 interposed between the racks that is adapted to be turned in a clockwise direction for drawing the discs toward each other. The pinion is turned by means of a gear 37 that is secured to a stub shaft 38, the latter having a lever 39 fixed thereto. This lever is disposed on the exterior of the housing 32 and is connected to the foot pedal 5 of the clutch through a link 40. The length of the link may be adjusted at 41 so as to swing the lever 39 through the proper arc as hereinafter mentioned. The operation of the selector in shifting the rods 18 and 19 will be set forth later in the specification.

Turning now to Figure 1, it will be seen that I provide a tubular member 42 that extends downwardly through the standard 43 of the steering mechanism, this member having a hand-grasping finger thereon that is made for riding over a scale 44 of the indicator designated generally at C. The finger is indicated by the numeral 45, and is provided with a spring-press pin or ball 46 arranged for entering recesses in the scale for holding the finger in adjusted position, although the finger may be advanced over the scale with but slight pressure being applied to the finger. The recesses are shown at 47.

Figure 4:
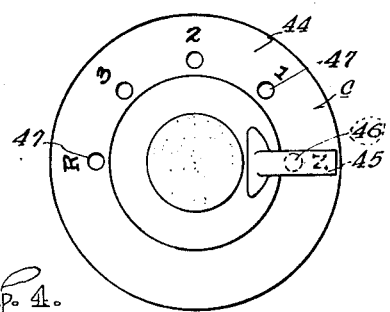
Figure 4 illustrates the indicator which I employ.

It will be noted that the finger is disposed in "neutral" position in Figure 4, and as the finger is advanced over the scale, the same is successively advanced through "low", "second", "third" and "reverse" positions.

The lower end of the tubular member 42 is provided with a pinion 48 which is in mesh with a second pinion 49 on the shaft 50, the latter in turn being connected to the shaft 29 of the selector 26 by means of level gearing 51. Upon moving the indicator finger to "low" position, the discs A and B in the selector are turned together by the rod or shaft 29 through the mechanism just described so as to bring the lines 52 in Figures 2 and 3 into coincidence with the center line 53, the latter representing a horizontal plane through the centers of the shifting rods 18 and 19 and the shaft 29.

With the selector thus set up for shifting into "low", the driver presses on the pedal 5, and during the initial movement thereof, the clutch is first disengaged before the lever 39 begins to swing, this being accomplished by means of a lost motion connection 54 between the link 40 and the pedal. As the discs A and B are further drawn towards each other, the solid wall portion 55 of the disc B butts against the end 56 of the shifting rod 19, and as the pedal 5 is moved still further, the rod 19 projects through the slot 57 in the disc A in the area indicated at 58, and the gears 15 and 21 are thereupon moved into driving engagement. During this movement, the shifting rod 18 remains in normal position, the disc A being slotted at 59 and the disc B at 60 so as to telescope over the rod 18.

However, should the transmission already be in "second", the opening 60 in the disc B will be closed by means of a gate 61 that is mounted for radial movement in the disc. The gate normally is urged outwardly by a spring 62 until the opening 63 therein is brought into registration with the slot or opening 60. As the disc B is turned for setting up "low", the outer rounded end of the gate 61 strikes a cam 64 so as to move the gate inwardly and temporarily close the opening 60. The gate is retained in this position and acts to shift the rod 18 back into "neutral", whereupon the gate clears the end of the cam 64 (see Figure 6), and the spring 62 then moves the gate outwardly until the opening 63 therein is positioned for telescoping over the rod 18. At this time, the discs have been moved through one-half of their stroke, and during the remainder of the stroke the rod 19 is moved into "low", while the rod 18 remains stationary. The outward movement of the gate is limited by means of stops 65 striking against shoulders 66.

Assuming now that the transmission is driving in "high" and it is desired to shift into "low". In this case the gate 67 on the disc A acts in a similar manner in cooperation with a cam 68 to disengage the transmission from "high" gear and return the rod 18 to normal before the rod 19 begins to move into "first" or "low". Likewise, if the transmission is running in "reverse" the disc B will return the rod 19 to a position for disengaging the gear 15 from the pinion 23, and during further movement of the selector discs, the rod 19 is advanced so as to shift the gear 15 into mesh with the gear 21 for constituting "low".

It will thus be apparent that regardless of which speed the transmission may be running in due to a previous shift, that the slidable gear on the shaft 10 will first be entirely disengaged before the new combination for "low" speed is effected, and this entire operation is accomplished during a single depression of the pedal 5. As the specification continues, it will be shown that the same is true of all of the other speeds of the transmission.

Particularly it will be seen in Figure 6 that the discs A and B, when in extended position, are arranged beyond the furthest movement of the shifting rods 18 and 19. Therefore, if one of the rods is moved for engaging a gear speed, and thereafter the pedal 5 is released, the discs will be disposed so as to clear the end of the shifted rod and thus allow the operator of the vehicle to set up a new speed, which may be effected any time subsequently and at his convenience and desire.

Figures 2, 3:
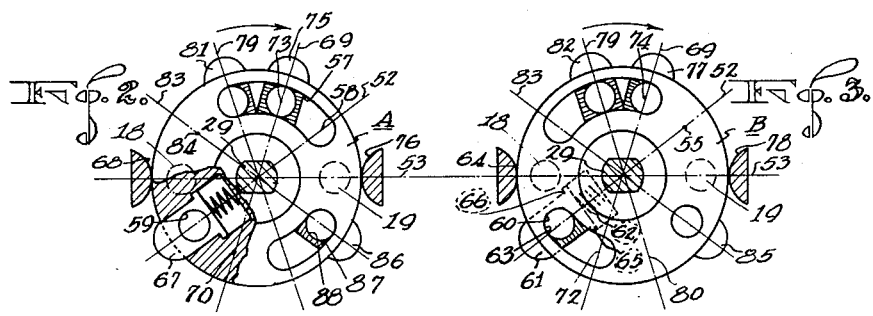

When the driver wishes to shift into "second", he first turns the indicator finger 45 over the scale to "second", and this swings the discs A and B in a clockwise direction in Figures 2 and 3 until the line 69 coincides with the line 53. This presents the solid wall portion 70 of the disc A into position for abutting the end 71 of the rod 18 upon moving the discs toward each other. At the same time the disc B is turned for allowing the rod 18 to be projected through the slot 60 in the area indicated at 72 (see Figure 2). The rod 19 during this operation remains stationary, if in normal position, since the opening 73 in the disc A and the opening 74 in the disc B are arranged for allowing the discs to telescope thereover. The spring-pressed gate 75 on the disc A, in cooperation with the cam 76 serves to return the rod 19 to normal, if the transmission should already be in "low"; while the gate 77 on the disc B cooperates with its cam 78 for disengaging the transmission from "reverse" in a similar manner should the transmission be so engaged from a previous shift. Likewise, if the transmission is running in "high", the disc A acts to return the rod 18 to normal before engaging the gears for "second".

In setting up the selector for a contemplated change to "third", the driver turns the finger 45 to the proper position on the scale 44, and this rotates the selector discs until the line 79 is turned clockwise into registration with the line 53. This brings the wall area 80 of the disc B into position for shifting the rod 18 to the left in Figure 6 for effecting "high" speed. In this case, the gate 81 on the disc A and the cam 76 serve to return the gears constituting "low" into disengagement as the selector discs are drawn toward each other, if these gears have been previously meshed. If the transmission is driving in "reverse" the gate 82 and the cam 78 first disengages the gears forming this speed before the new combination is completed.

On the other hand, if the transmission is running in "second" and the selector has been moved for shifting into "high", the disc B during the first half of its movement toward the disc A disengages the gears 14 and 20 completely before the clutch elements 24 and 25 are meshed for "high".

When the driver contemplates a change to "reverse", the finger 45 is moved accordingly, and this rotates the selector discs a still further step than for "high", and brings the lines 83 into the horizontal plane indicated by the numeral 53, and thereafter the selector discs are drawn toward each other. The walled portion 84 on the disc A abuts the rod 19 and moves the latter into a position for shifting the transmission into "reverse". During this operation, the gate 85 coacts with its cam 64 and serves to disengage the transmission in the event that the gears forming this speed are in mesh. In a similar manner, the gate 86 on the disc A strikes its cam 68 during the setting of the selector for a change into "reverse" and closes the opening 87 in the disc until such time as the rod 18 is returned to normal, whereupon the cam is cleared and the opening 88 is brought into registration with the opening 87, and thus the rod 18 is permitted to remain stationary during further movement of the discs.

The returning of gears to "neutral" which may be engaged is accomplished by bringing the indicator finger 45 to the proper marking on the indicator, and this places the selector discs in the relative position illustrated in Figures 2 and 3. Upon depressing the pedal 5, the rods 18 and 19 are shifted into normal position; that is, into the position shown in Figure 6. As the pedal is released, the discs separate so as to position the same from the ends of the shifting rods by a distance equal to the movement required for engaging the gears.

Having thus described the various parts and operation of my transmission, the functioning thereof may be readily understood. The driver sets the indicator at any convenient time for a contemplated change in speed, and upon depressing the pedal 5, the clutch is first released, and further movement operates to disengage the old combination of gears should the transmission be in driving position. Still further movement engages the newly selected gears. These steps follow without interruption and during a single operation of the clutch pedal.

Having thus described the various parts and operation thereof, what I desire to secure by United States Letters Patent is:

1. In a gear shifting mechanism, parallel shifting rods movable endwise from normal, a shaft mounted therebetween, companion selectors slidable on the shaft and rotatable therewith, the selectors being arranged on the opposite ends of the rods, and including portions selectively engageable with the rods, means for turning the shaft to set the selectors, means on the selectors for carrying a previously shifted rod back to normal and being thereupon releasable, means for effecting the release, and means for moving the selectors toward each other to effect the shifting.

2. In a gear shifting mechanism, shifting rods movable endwise from normal, companion selectors arranged in confronting relation and on opposite ends of the rods, means supporting the selectors for angular and axial movements, the selectors having portions selectively abuttable the rods to move the latter, means for turning the selectors to set the same, means on the selectors movable into position to return a previously shifted rod to normal, and having means coacting therewith to release the returning rod when the latter has been carried to normal, and means for moving the selectors axially.

3. In a gear shifting mechanism, shifting rods movable endwise from normal, companion selector discs arranged on opposite ends of the rods, means mounting the discs for angular and axial movements, the discs having slotted portions for telescoping over the rods and made to abut one of the rods at a time with an unslotted portion, means for turning the discs to set the latter, means on the discs to carry a previously shifted rod back to normal, means for thereupon releasing the returned rod, and means for moving the discs axially to effect the shifting.

4. In a gear shifting mechanism, a pair of selector discs arranged in confronting relation and having slots therein, means mounting the discs for angular and axial movements, shifting rods supported between the rods for telescoping through the slots, means for closing certain of the slots upon turning the discs so as to engage the rods as selected, means for adjusting the discs angularly, and means for moving the discs axially toward and away from each other.

5. In a gear shifting mechanism, a selector disc having slots therein, gates movably carried on the disc for closing certain of the slots and projecting from the disc periphery, means mounting the disc for angular and axial movements, means for moving the gates into open position relative to their respective slots, and cams extending axially of the disc for closing the gates as the disc is turned and for holding the gates closed until the disc has been moved axially to clear the end of the cams.

6. In a gear selecting and shifting mechanism, a selector disc having rod-receiving openings, means mounting the disc for angular and axial movements, means for closing certain of the openings as the disc is turned so as to present abutments when the disc is subsequently moved axially, and means for turning the disc to set the latter.

7. In a gear selecting and shifting mechanism, a selector disc having rod-receiving openings, means mounting the disc for angular and axial movements, means for closing certain of the openings as the disc is turned so as to present abutments when the disc is subsequently moved axially, means for moving the disc angularly to effect the closing, and means for reopening the openings after a predetermined axial movement of the disc.

8. In a gear shifting mechanism, shifting rods movable endwise from normal, companion selectors mounted on opposite ends of the rods and in confronting relation, means supporting the selectors for angular and axial movements, the selectors having portions selectively abuttable the ends of the rods to move the latter, means for turning the selectors for setting the same, means movable into active position upon turning the selectors made to carry a previously shifted rod back to normal upon drawing the selectors toward each other, further inward movement of the selectors abutting the latter against the rod selected to effect shifting thereof, and means for operating the selectors toward and away from each other.

RICHARD B. SPIKES.